(12) United States Patent
Arbel et al.

(10) Patent No.: US 8,758,613 B2
(45) Date of Patent: Jun. 24, 2014

(54) DYNAMIC ANAEROBIC AEROBIC (DANA) REACTOR

(75) Inventors: Tamar Arbel, Karmiel (IL); Nir Assulin, Emek Hefer (IL); Antonius Johannes Hendrikus Hyacinthus Engelaar, Oppenhuzien (NL); Tammy Yalin, Netanya (IL)

(73) Assignees: Aqwise-Wise Water Technologies Ltd, Harzliya (IL); Westt, Leeuwarden (NL)

( * ) Notice: Subject to any disclaimer, the term of this patent is extended or adjusted under 35 U.S.C. 154(b) by 656 days.

(21) Appl. No.: 12/905,917

(22) Filed: Oct. 15, 2010

(65) Prior Publication Data

US 2011/0089106 A1    Apr. 21, 2011

Related U.S. Application Data

(60) Provisional application No. 61/252,265, filed on Oct. 16, 2009, provisional application No. 61/366,576, filed on Jul. 22, 2010.

(51) Int. Cl.
*C02F 3/30* (2006.01)

(52) U.S. Cl.
USPC ............ 210/603; 210/605; 210/615; 210/260

(58) Field of Classification Search
USPC .......... 210/603, 605, 615, 616, 617, 260, 261
See application file for complete search history.

(56) References Cited

U.S. PATENT DOCUMENTS

| | | |
|---|---|---|
| 1,498,360 A | 6/1924 | Douglas |
| 1,790,975 A | 2/1931 | Dallas et al. |
| 2,709,128 A | 5/1955 | Krause |
| 3,133,017 A | 5/1964 | Lambeth |
| 3,168,465 A | 2/1965 | Kraus |
| 3,506,125 A | 4/1970 | Willis |
| 3,957,931 A | 5/1976 | Ellis et al. |
| 4,045,344 A | 8/1977 | Yokota |
| 4,137,171 A | 1/1979 | Yokata |
| 4,159,945 A | 7/1979 | Savage |
| 4,177,144 A | 12/1979 | Hickey et al. |
| 4,179,366 A | 12/1979 | Kaelin |
| 4,188,289 A | 2/1980 | Besik |
| 4,231,863 A | 11/1980 | Sutphin |
| 4,244,531 A | 1/1981 | Szegvari |
| 4,256,573 A | 3/1981 | Shimodaira et al. |

(Continued)

FOREIGN PATENT DOCUMENTS

| | | |
|---|---|---|
| DE | 39 16 520 | 11/1990 |
| EP | 0075059 | 3/1983 |

(Continued)

OTHER PUBLICATIONS

An Office Action together with the English translation dated Sep. 24, 2012, which issued during the prosecution of Israel Patent Application No. 196647.

(Continued)

*Primary Examiner* — Fred Prince
(74) *Attorney, Agent, or Firm* — Sughrue Mion, PLLC

(57) ABSTRACT

An anaerobic water purification system including an anaerobic water purification unit receiving water to be treated and providing an anaerobic-treated water output and biomass carriers for supporting anaerobic microorganisms in the anaerobic water purification unit.

29 Claims, 7 Drawing Sheets

(56) References Cited

U.S. PATENT DOCUMENTS

| | | | |
|---|---|---|---|
| 4,279,753 A | 7/1981 | Nielson et al. | |
| 4,310,437 A | 1/1982 | Schreiber | |
| 4,322,296 A | 3/1982 | Fan et al. | |
| 4,333,893 A | 6/1982 | Clyde | |
| 4,373,024 A | 2/1983 | Hunt | |
| 4,374,730 A | 2/1983 | Braha et al. | |
| 4,385,988 A | 5/1983 | Hypponen | |
| 4,394,268 A | 7/1983 | Reid | |
| 4,454,038 A | 6/1984 | Shimodaira et al. | |
| 4,507,546 A | 3/1985 | Fortune et al. | |
| 4,521,311 A | 6/1985 | Fuchs et al. | |
| 4,522,767 A | 6/1985 | Billet et al. | |
| 4,537,731 A | 8/1985 | Billet et al. | |
| 4,561,974 A | 12/1985 | Bernard et al. | |
| 4,566,971 A | 1/1986 | Reimann et al. | |
| 4,599,174 A | 7/1986 | McDowell | |
| 4,620,929 A | 11/1986 | Hofmann | |
| 4,632,758 A | 12/1986 | Whittle | |
| 4,664,803 A * | 5/1987 | Fuchs et al. | 210/603 |
| 4,780,198 A | 10/1988 | Crawford et al. | |
| 4,810,377 A | 3/1989 | Kato et al. | |
| 4,814,085 A | 3/1989 | Fujii et al. | |
| 4,814,125 A | 3/1989 | Fujii et al. | |
| 4,820,415 A | 4/1989 | Reischl | |
| 4,839,053 A | 6/1989 | Tharp | |
| 4,842,920 A | 6/1989 | Banai et al. | |
| 4,895,645 A * | 1/1990 | Zorich, Jr. | 210/98 |
| 4,919,815 A | 4/1990 | Copa et al. | |
| 4,960,509 A | 10/1990 | McNeill | |
| 4,960,540 A | 10/1990 | Friel, Jr. et al. | |
| 4,985,182 A | 1/1991 | Basse et al. | |
| 4,999,103 A | 3/1991 | Bogart | |
| 5,030,353 A | 7/1991 | Stuth | |
| 5,080,793 A | 1/1992 | Urlings | |
| 5,108,655 A | 4/1992 | Johns, Jr. et al. | |
| 5,143,618 A * | 9/1992 | Hyun et al. | 210/615 |
| 5,168,058 A | 12/1992 | Bohak et al. | |
| 5,192,442 A | 3/1993 | Piccirillo et al. | |
| 5,196,111 A | 3/1993 | Nicol et al. | |
| 5,200,081 A | 4/1993 | Stuth | |
| 5,202,027 A | 4/1993 | Stuth | |
| 5,217,616 A | 6/1993 | Sanyal et al. | |
| 5,429,740 A | 7/1995 | Van Der Herberg | |
| 5,458,779 A | 10/1995 | Odegaard | |
| 5,486,292 A | 1/1996 | Bair et al. | |
| 5,490,934 A | 2/1996 | Schmid | |
| 5,543,039 A | 8/1996 | Odegaard | |
| 5,554,289 A | 9/1996 | Grounds | |
| 5,558,763 A | 9/1996 | Funakoshi et al. | |
| 5,578,214 A | 11/1996 | Yamasaki et al. | |
| 5,599,451 A * | 2/1997 | Guiot | 210/605 |
| 5,698,094 A | 12/1997 | Abdellatif et al. | |
| 5,702,604 A * | 12/1997 | Yamasaki et al. | 210/603 |
| 5,766,454 A | 6/1998 | Cox et al. | |
| 5,779,886 A | 7/1998 | Couture | |
| 5,783,066 A | 7/1998 | Aylmore | |
| 5,783,069 A | 7/1998 | Frank | |
| 5,783,089 A | 7/1998 | Anderson et al. | |
| 5,788,838 A | 8/1998 | Yamasaki et al. | |
| 5,827,453 A | 10/1998 | Gross et al. | |
| 5,855,785 A | 1/1999 | Heijnen et al. | |
| 5,871,674 A | 2/1999 | Leva | |
| 5,902,484 A | 5/1999 | Timpany | |
| 5,908,555 A | 6/1999 | Reinsel et al. | |
| 5,928,493 A | 7/1999 | Morkovsky et al. | |
| 5,948,262 A | 9/1999 | Todd et al. | |
| 5,962,309 A | 10/1999 | Kumagai et al. | |
| 5,976,365 A | 11/1999 | Petit | |
| 5,980,738 A | 11/1999 | Heitkamp et al. | |
| 5,981,272 A | 11/1999 | Chang | |
| 5,985,148 A | 11/1999 | Liu | |
| 5,993,650 A | 11/1999 | Kim | |
| 6,015,497 A | 1/2000 | Steen, Jr. | |
| 6,063,268 A | 5/2000 | Jowett | |
| 6,063,273 A * | 5/2000 | Habets et al. | 210/188 |
| 6,063,863 A | 5/2000 | Yu et al. | |
| 6,077,424 A | 6/2000 | Katsukura et al. | |
| 6,110,389 A | 8/2000 | Horowitz | |
| 6,126,829 A | 10/2000 | Gunnarsson et al. | |
| 6,136,194 A | 10/2000 | Vogel et al. | |
| 6,156,204 A | 12/2000 | Todd et al. | |
| 6,207,722 B1 | 3/2001 | Juen et al. | |
| 6,210,578 B1 | 4/2001 | Sagastume et al. | |
| 6,534,550 B1 | 3/2003 | Walterick, Jr. | |
| 6,565,750 B2 | 5/2003 | Nasr | |
| 6,616,845 B2 | 9/2003 | Shechter et al. | |
| 6,623,640 B2 | 9/2003 | Lanting et al. | |
| 6,660,164 B1 | 12/2003 | Stover | |
| 6,682,653 B2 | 1/2004 | Chuang et al. | |
| 6,689,271 B2 | 2/2004 | Morkovsky et al. | |
| 6,726,838 B2 | 4/2004 | Shechter et al. | |
| 6,758,886 B2 | 7/2004 | Vellinga | |
| 6,960,304 B1 | 11/2005 | Brown et al. | |
| 6,962,653 B2 | 11/2005 | Jeong | |
| 7,001,519 B2 | 2/2006 | Linden et al. | |
| 7,022,226 B2 | 4/2006 | Nam et al. | |
| 7,022,233 B2 | 4/2006 | Chen | |
| 7,135,110 B2 | 11/2006 | McGrath | |
| 7,670,489 B2 * | 3/2010 | Torrijos et al. | 210/603 |
| 7,699,177 B2 | 4/2010 | Craig | |
| 2003/0087969 A1 | 5/2003 | Slone et al. | |
| 2003/0098277 A1 * | 5/2003 | Khudenko | 210/601 |
| 2004/0089592 A1 | 5/2004 | Shechter et al. | |
| 2004/0206699 A1 * | 10/2004 | Ho et al. | 210/605 |
| 2005/0167359 A1 * | 8/2005 | Wilkie | 210/603 |
| 2006/0124518 A1 | 6/2006 | Monosov et al. | |
| 2006/0138048 A1 | 6/2006 | Hu et al. | |
| 2006/0186027 A1 | 8/2006 | Geneys et al. | |
| 2008/0053897 A1 * | 3/2008 | Zhu et al. | 210/605 |
| 2009/0032451 A1 * | 2/2009 | Tsutsumi et al. | 210/150 |
| 2009/0035848 A1 * | 2/2009 | Hickey | 435/296.1 |
| 2009/0211972 A1 | 8/2009 | Shechter et al. | |
| 2010/0180768 A1 | 7/2010 | Folkvang | |

FOREIGN PATENT DOCUMENTS

| | | |
|---|---|---|
| EP | 0382340 | 8/1990 |
| EP | 0575314 | 10/1994 |
| EP | 1340720 | 9/2003 |
| ES | 2064083 | 7/2004 |
| FR | 2707183 | 1/1995 |
| JP | 54-54453 A * | 4/1979 |
| WO | WO 91/11396 | 8/1991 |
| WO | WO 95/25072 | 9/1995 |
| WO | WO 95/33695 | 12/1995 |
| WO | WO 02/096806 | 12/2002 |
| WO | WO 2007/029256 | 3/2007 |
| WO | WO 2008/018077 | 2/2008 |
| WO | WO 09/10718 | 1/2009 |

OTHER PUBLICATIONS

"Biological treatment of highly foaming pharmaceutical wastewater by modified bubble-column under mechanical foam control", K. Yamagiwa, M. Yoshida, A. Ohkawa and S. Takesono, Water Science & Technology, vol. 42 No. 3-4, pp. 331-337, IWA Publishing 2000.

"Performance characteristics of mechanical foam-breakers fitted to a stirred-tank reactor", Takesono S., Onodera M., Yoshida M., Yamagiwa K., Ohkawa A., Journal of Chemical Technology & Biotechnology, vol. 78, No. 1, Jan. 2003, pp. 48-55(8).

Database WPI Week 198730 Derwent Publications Ltd., London, GB; An 1987-209691, XP002381758 & JP 62 136296, Jun. 19, 1987, an abstract.

Database WPI Week 199901 Derwent Publications Ltd., London, GB; An 1999-003480, XP002381759 & JP 10 277536, Oct. 20, 1998, an abstract.

Patent Abstracts of Japan vol. 1996, No. 2, Feb. 29, 1996 & JP 07 275886, Oct. 24, 1995.

An International Search Report dated May 14, 2009, which issued during the prosecution of Applicant's PCT/IL09/00209.

(56) References Cited

OTHER PUBLICATIONS

An Office Action dated Sep. 30, 2010, which issued during the prosecution of Applicant's U.S. Appl. No. 12/309,376.
An Office Action dated Mar. 3, 2011, which issued during the prosecution of Applicant's U.S. Appl. No. 12/309,376.
http://www.paques.nl BIOPAQ® UBOX, Oct. 14, 2010.
http://www.paques.nl BIOPAQ® UASB+ Oct. 14, 2010.
An International Search Report and a Written Opinion both dated Aug. 6, 2013, which issued during the prosecution of Applicant's PCT/IL2013/050391.

* cited by examiner

`US 8,758,613 B2`

DYNAMIC ANAEROBIC AEROBIC (DANA) REACTOR

REFERENCE TO RELATED APPLICATIONS

Reference is made to U.S. Provisional Patent Application Ser. No. 61/252,265, filed Oct. 16, 2009 and entitled "DYNAMIC ANAEROBIC AEROBIC (DANA) REACTOR" and U.S. Provisional Patent Application Ser. No. 61/366,576, filed Jul. 22, 2010 and entitled "UTILIZATION OF BIOMASS CARRIERS IN ANAEROBIC REACTORS", the disclosures of which are hereby incorporated by reference and priority of which are hereby claimed pursuant to 37 CFR 1.78(a) (4) and (5) (i).

Reference is also made to the following patents and patent applications, owned by assignee, the disclosures of which are hereby incorporated by reference:

U.S. Published Patent Application No. 2009/0211972;
European Published Patent Application Nos. 1401775 and 2049443; and
PCT Published Patent Application No. WO 2009/10718.

FIELD OF THE INVENTION

The present invention relates to water treatment generally and more particularly to waste water treatment.

BACKGROUND OF THE INVENTION

The following publications are believed to represent the current state of the art:

U.S. Pat. Nos.: 3,168,465; 4,632,758; 4,780,198; 4,919,815; 5,196,111; 5,578,214; 5,788,838; 5,855,785; 6,063,273; 6,623,640; 6,758,886 and 7,022,226;

European Patent No.: 0 382 340;

http://www.paques.nl/?pid=245&parentid=41, which describes the Paques BIOPAQ® UASB+ system; and http://www.paques.nl/?pid=44&parentid=41, which describes the Paques BIOPAQ® UBOX system.

SUMMARY OF THE INVENTION

The present invention seeks to provide improved systems and methodologies for water treatment.

There is thus provided in accordance with a preferred embodiment of the present invention an anaerobic water purification system including an anaerobic water purification unit receiving water to be treated and providing an anaerobic-treated water output and biomass carriers for supporting anaerobic microorganisms in the anaerobic water purification unit. Preferably, the system also includes a gas collection volume located above the anaerobic water purification unit for collecting gas produced by the anaerobic water purification unit.

In accordance with a preferred embodiment of the present invention, the gas collection volume is located in a headspace above the anaerobic water purification unit. Additionally, the system also includes gas supply functionality for supplying gas to the anaerobic water purification unit for causing relative movement of the biomass carriers. Preferably, the gas supply functionality supplies gas received from the gas collection volume.

Preferably, the anaerobic water purification unit receives water to be treated at a location near the bottom thereof. Alternatively, the anaerobic water purification unit receives water to be treated at a location near the top thereof There is also provided in accordance with another preferred embodiment of the present invention an anaerobic/aerobic water purification system including an anaerobic water purification subsystem receiving water to be treated and providing an anaerobic-treated water output, and an aerobic water purification subsystem, integrated with the anaerobic water purification subsystem, receiving the anaerobic-treated water output and providing an anaerobic- and aerobic-treated water output.

Preferably, the aerobic water purification subsystem is located physically above the anaerobic water purification subsystem. Additionally, the anaerobic water purification subsystem includes biomass carriers for supporting anaerobic microorganisms.

In accordance with a preferred embodiment of the present invention, the system also includes a gas collection volume located above the anaerobic water purification subsystem and below the aerobic water purification subsystem for collecting gas produced by the anaerobic water purification subsystem. Preferably, the gas collection volume is located in a headspace above the anaerobic water purification subsystem.

Preferably, pressure created by the accumulation of the gas produced by the anaerobic water purification subsystem is operative to pump the anaerobic-treated water output from the anaerobic water purification subsystem to the aerobic water purification subsystem. Additionally, the system also includes gas supply functionality for supplying gas to the anaerobic water purification subsystem for causing relative movement of the biomass carriers. Preferably, the gas supply functionality supplies gas received from the gas collection volume.

In accordance with a preferred embodiment of the present invention, the aerobic water purification subsystem includes moving bed biofilm reactor functionality. Preferably, the anaerobic water purification subsystem receives water to be treated at a location near the bottom thereof.

There is further provided in accordance with yet another preferred embodiment of the present invention an anaerobic/aerobic water purification system including an anaerobic water purification subsystem receiving water to be treated, including biomass carriers for supporting anaerobic microorganisms, and providing an anaerobic-treated water output, and an aerobic water purification subsystem, receiving the anaerobic-treated water output and providing an anaerobic- and aerobic-treated water output. Preferably, the aerobic water purification subsystem is located physically above the anaerobic water purification subsystem.

In accordance with a preferred embodiment of the present invention, the system also includes a gas collection volume located above the anaerobic water purification subsystem and below the aerobic water purification subsystem for collecting gas produced by the anaerobic water purification subsystem. Preferably, the gas collection volume is located in a headspace above the anaerobic water purification subsystem.

Preferably, pressure created by the accumulation of the gas produced by the anaerobic water purification subsystem is operative to pump the anaerobic-treated water output from the anaerobic water purification subsystem to the aerobic water purification subsystem. Additionally, the system also includes gas supply functionality for supplying gas to the anaerobic water purification subsystem for causing relative movement of the biomass carriers. Preferably, the gas supply functionality supplies gas received from the gas collection volume.

In accordance with a preferred embodiment of the present invention, the aerobic water purification subsystem includes moving bed biofilm reactor functionality. Additionally or alternatively, the aerobic water purification subsystem includes moving bed clarifying reactor functionality.

Preferably, the anaerobic water purification subsystem receives water to be treated at a location near the bottom thereof. Alternatively, the anaerobic water purification subsystem receives water to be treated at a location near the top thereof There is yet further provided in accordance with still another preferred embodiment of the present invention an anaerobic/aerobic water purification system including an anaerobic water purification subsystem receiving water to be treated and providing an anaerobic-treated water output, an aerobic water purification subsystem, located physically above the anaerobic water purification subsystem, receiving the anaerobic-treated water output and providing an anaerobic- and aerobic-treated water output, and a gas collection volume located above the anaerobic water purification subsystem and below the aerobic water purification subsystem for collecting gas produced by the anaerobic water purification subsystem.

Preferably, the gas collection volume is located in a headspace above the anaerobic water purification subsystem. Additionally, pressure created by the accumulation of the gas produced by the anaerobic water purification subsystem is operative to pump the anaerobic-treated water output from the anaerobic water purification subsystem to the aerobic water purification subsystem.

In accordance with a preferred embodiment of the present invention, the system also includes gas supply functionality for supplying gas to the anaerobic water purification subsystem for causing relative movement of the biomass carriers. Preferably, the gas supply functionality supplies gas received from the gas collection volume.

Preferably, the aerobic water purification subsystem includes moving bed biofilm reactor functionality. Additionally, the aerobic water purification subsystem includes moving bed clarifying reactor functionality. Preferably, the anaerobic water purification subsystem receives water to be treated at a location near the bottom thereof There is also provided in accordance with another preferred embodiment of the present invention an anaerobic/aerobic water purification method including anaerobic water purification providing an anaerobic-treated water output, and aerobic water purification, integrated with the anaerobic water purification, receiving the anaerobic-treated water output and providing an anaerobic- and aerobic-treated water output. Preferably, the anaerobic water purification utilizes biomass carriers for supporting anaerobic microorganisms.

Preferably, the method also includes collecting gas produced by the anaerobic water purification in a headspace. Additionally, the aerobic water purification includes moving bed biofilm reactor functionality. Additionally or alternatively, the aerobic water purification includes moving bed clarifying reactor functionality.

There is further provided in accordance with yet another preferred embodiment of the present invention an anaerobic/aerobic water purification method including anaerobic water purification utilizing biomass carriers for supporting anaerobic microorganisms and providing an anaerobic-treated water output, and aerobic water purification receiving the anaerobic-treated water output and providing an anaerobic- and aerobic-treated water output.

In accordance with a preferred embodiment of the present invention, pressure created by the accumulation of the gas produced by the anaerobic water purification is operative to pump the anaerobic-treated water output from the anaerobic water purification to the aerobic water purification. Preferably, the method also includes collecting gas produced by the anaerobic water purification in a headspace.

Preferably, the method also includes supplying gas to the anaerobic water purification subsystem for causing relative movement of the biomass carriers. Preferably, the supplying gas utilizes gas received from the headspace.

In accordance with a preferred embodiment of the present invention, the aerobic water purification includes moving bed biofilm reactor functionality. Additionally or alternatively, the aerobic water purification includes moving bed clarifying reactor functionality.

There is also provided in accordance with another preferred embodiment of the present invention an anaerobic/aerobic liquid purification system including an anaerobic liquid purification subsystem including an inlet for receiving liquid to be treated and an outlet providing an anaerobic-treated liquid output, and an aerobic liquid purification subsystem including an inlet for receiving the anaerobic-treated liquid output and an outlet for providing an anaerobic- and aerobic-treated liquid output, and wherein the inlet of the aerobic liquid purification subsystem is connected to the outlet of the anaerobic liquid purification subsystem.

In accordance with a preferred embodiment of the present invention, pressure in the anaerobic liquid purification subsystem is operative to pump the anaerobic-treated liquid output from the anaerobic liquid purification subsystem to the aerobic liquid purification subsystem. Preferably, the system also includes a gas collection volume located in a headspace above the anaerobic liquid purification subsystem for collecting gas produced by the anaerobic liquid purification system.

Preferably, the aerobic liquid purification subsystem is located above the anaerobic liquid purification subsystem. Additionally, the anaerobic liquid purification subsystem includes biomass carriers for supporting anaerobic microorganisms.

Preferably, the system also includes a gas supply mechanism for supplying gas to the anaerobic liquid purification subsystem. Preferably, the gas supply mechanism is connected to the gas collection volume.

In accordance with a preferred embodiment of the present invention, the aerobic liquid purification subsystem further includes moving bed biofilm reactor functionality. Additionally, the system also includes liquid recirculation functionality.

There is further provided in accordance with yet another preferred embodiment of the present invention an anaerobic/aerobic liquid purification method including anaerobic purifying of liquid in an anaerobic liquid purification subsystem provided with an anaerobic-treated liquid outlet, aerobic purifying of liquid in an aerobic liquid purification subsystem provided with an inlet for receiving the anaerobic-treated liquid, and integrating the subsystems by connecting the outlet of the anaerobic subsystem to the inlet of the aerobic subsystem.

In accordance with a preferred embodiment of the present invention, pressure in the anaerobic liquid purification subsystem is operative to pump anaerobic-treated liquid output from the anaerobic liquid purification subsystem to the aerobic liquid purification subsystem. Preferably, at least one of the anaerobic purifying and the aerobic purifying utilizes biomass carriers for supporting microorganisms.

Preferably, at least one of the aerobic liquid purification subsystem and the anaerobic liquid purification subsystem includes moving bed biofilm reactor functionality. Additionally, the method also includes supplying gas to the anaerobic liquid purification subsystem for causing relative movement of the biomass carriers. Preferably, the supplying gas utilizes gas produced in the anaerobic liquid purification subsystem.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
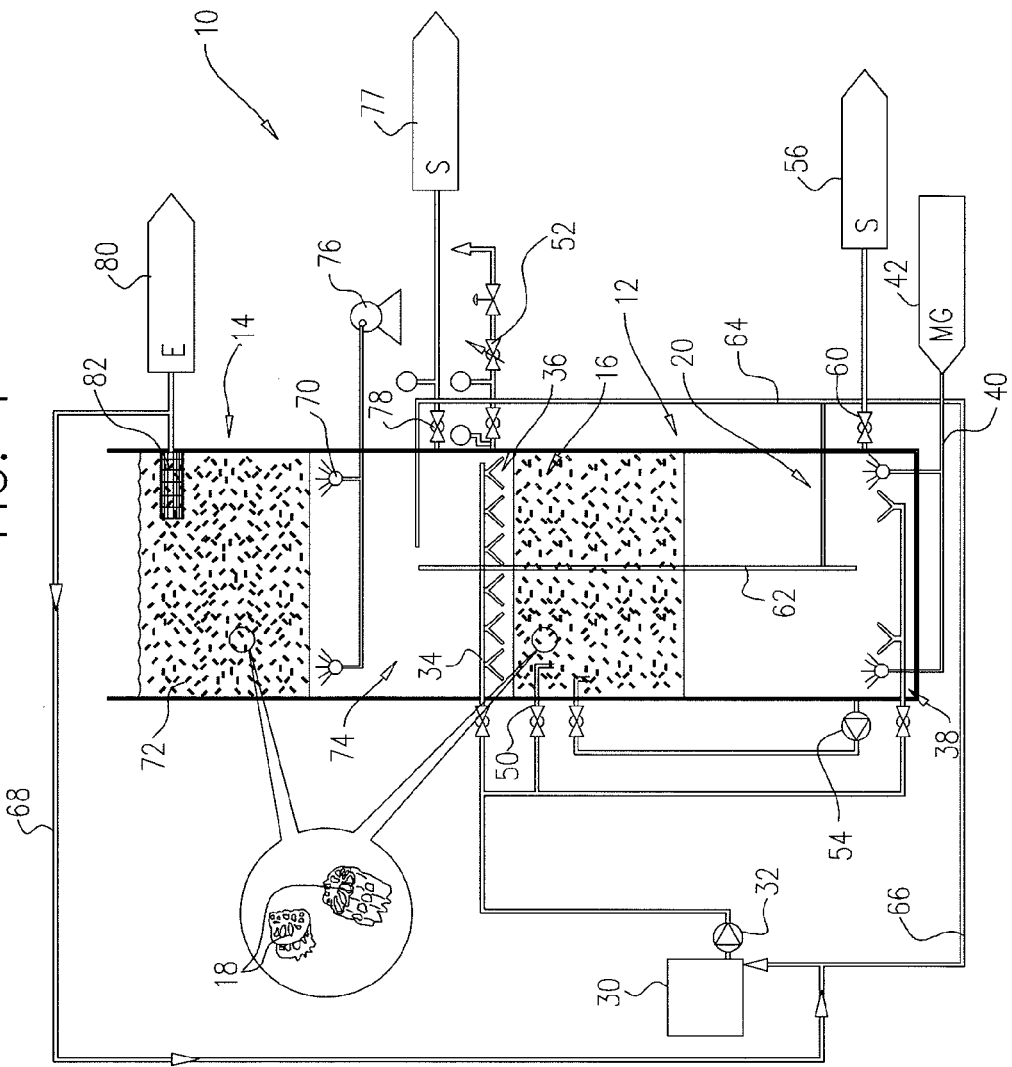
FIG. 1 is a simplified, partially pictorial, partially schematic, illustration of a synergetic anaerobic/aerobic water purification system constructed and operative in accordance with a preferred embodiment of the present invention.

Reference is now made to FIG. 1, which is a simplified, partially pictorial, partially schematic, illustration of a synergetic anaerobic/aerobic water purification system constructed and operative in accordance with a preferred embodiment of the present invention. As seen in FIG. 1, there is provided an integrated reactor, designated generally by reference numeral 10, which includes an anaerobic water purification subsystem 12 and an aerobic water purification subsystem 14.

Anaerobic water purification subsystem 12 comprises an upper zone 16 which includes a plurality of biomass carriers 18, and a lower zone 20 located below upper zone 16.

In the embodiment of FIG. 1, anaerobic water purification subsystem 12 may be configured to operate as a Moving Bed Biofilm Reactor (MBBR) wherein biomass carriers 18 are continuously circulated. Alternatively, biomass carriers 18 are periodically circulated or vibrated. Preferably, biomass carriers 18 have a density which is lower than the density of water. Alternatively, biomass carriers have a density which is equal to or greater than the density of water.

Reactor 10 also includes a pre-acidification tank 30 wherein untreated wastewater is initially pre-acidified. This enables diluting concentrated untreated wastewater while producing influent to be introduced into reactor 10 with a constant feed load. Additionally, nitrogen, phosphorus, pH, temperature and anti-foam can be regulated in pre-acidification tank 30 if necessary.

After being pre-acidified in pre-acidification tank 30, wastewater is pumped out of tank 30 by pump 32, and is introduced into anaerobic water purification subsystem 12 from above by means of a plurality of nozzles 34, positioned at the top of a gas head space 36 of anaerobic water purification subsystem 12. Alternatively, wastewater is introduced into anaerobic water purification subsystem 12 from below, through wastewater inlet conduit 38.

Influent is sprayed onto upper zone 16 which consists of anaerobic biomass attached to floating biomass carriers 18. The influent flows from the top of upper zone 16 to the bottom of upper zone 16 through biomass carriers 18. The organic matter of the influent is converted by the anaerobic biomass into biogas which remains entrapped in between biomass carriers 18 and in cavities of biomass carriers 18.

Preferably, the release of the biogas is achieved by Mixing Gas (MG) injection. Gas is injected into lower zone 20 of anaerobic water purification subsystem 12 through gas injectors 40. Gas bubbles then rise towards gas head space 36 above upper zone 16. The rising bubbles disturb the consistency of biomass carriers 18, thereby releasing biogas entrapped therein. Additionally, channeling is prevented. The released biogas rises towards gas head space 36 above upper zone 16.

Alternatively, jets 50 can be placed in the wall of upper zone 16, which are operative to circulate the anaerobic effluent in upper zone 16. The circulation of the anaerobic effluent causes movement of biomass carriers 18 thereby releasing biogas entrapped therein. Additionally, channeling is prevented.

To ensure a constant level of gas in gas head space 36, the pressure of gas collected in head space 20 is controlled by a reducing valve 52 or by a water column (not shown) at a height equal to or greater than the level of anaerobic wastewater in upper zone 16.

The biogas produced in anaerobic water purification subsystem 12 consists primarily of methane ($CH_4$) and carbon-dioxide ($CO_2$). Due to recirculation, part of the produced $CO_2$ is removed, which causes an increase of the pH level of the anaerobic effluent. This reduces the reagents consumption dramatically.

Biological conversion of up to 90% of mostly organic matter is performed by the anaerobic biomass attached to floating biomass carriers 18. To ensure efficient conversion of up to 90% of the organic matter in anaerobic water purification subsystem 12 and to facilitate attachment of anaerobic biomass to biomass carriers 18, the flow-through rate and the hydraulic retention time (refresh rate) of the wastewater must be sufficiently high.

The immobilization of anaerobic biomass on biomass carriers 18 prevents anaerobic biomass from leaving anaerobic water purification subsystem 12 and reaching aerobic water purification subsystem 14.

It is a particular feature of the present invention that the use of biomass carriers in anaerobic water purification subsystem 12 allows obviating the conventional three-phase separation, before biogas collection.

Preferably, circulation of wastewater within anaerobic water purification subsystem 12 is achieved by pumping wastewater from the bottom of anaerobic water purification subsystem 12 to the top of anaerobic water purification subsystem using a pump 54, and then dispersing the circulated wastewater by diffusers or jets 50. Alternatively, circulation of wastewater is achieved by a mechanical mixer (not shown).

Preferably, anaerobic sludge 56 (S) which accumulates at the bottom of anaerobic water purification subsystem 12 is circulated by a mechanical mixer, a circulation pump or any other circulation device. Additionally or alternatively, the anaerobic sludge 56 is drained from anaerobic water purification subsystem 12 by means of a drain valve 60.

Anaerobic effluent produced by anaerobic water purification subsystem 12 flows to aerobic water purification subsystem 14 via an internal conduit 62 for further treatment of organic matter. Alternatively, the transition of wastewater from the anaerobic water purification subsystem 12 to aerobic water purification subsystem 14 is achieved by an external conduit 64. Additionally or alternatively, anaerobic and/or aerobic effluent is returned to pre-acidification tank 30 from anaerobic water purification subsystem 12 through recirculation pipe 66, and/or from aerobic water purification subsystem 14 through recirculation pipe 68.

Aerobic water purification subsystem 14 comprises gas diffusers 70 that can be installed on the bottom of aerobic water purification subsystem 14 or above the bottom of aerobic water purification subsystem 14, consistent with the Moving Bed Biofilm reactor (MBBR) configuration or with the Moving Bed Clarifying Reactor (MBCR) configuration as shown in PCT/IL 2009/000825, respectively.

When the MBCR configuration is applied, gas diffuser outlets 70 are arranged generally between an upper biological treatment turbulence region 72 and a lower solids settling region 74, and provide gas bubbles which move upwardly through wastewater in aerobic water purification subsystem 14 and through a plurality of biomass carriers 18 disposed within upper biological treatment turbulence region 72, and create turbulent motion of wastewater in upper biological treatment turbulence region 72. The gas bubbles, typically of pressurized air, are supplied to outlets 70 via a gas inlet 76. The outlets 70 may include one or more coarse or fine bubble diffusers and jets.

Sludge 77 (S) produced in aerobic water purification subsystem 14 is drained by valve 78. Treated effluent 80 (E) leaves aerobic water purification subsystem 14 and reactor 10 via a wedge wire screen 82 coupled to a wastewater outlet in order to prevent carriers 18 from leaving aerobic water purification subsystem 14.

It is a particular feature of the present invention that most of the organic matter conversion is performed in the anaerobic water purification subsystem 12 of reactor 10. It is another particular feature of the present invention that the aerobic water purification subsystem 14 is filled with biomass carriers 18 which increase the effective surface area of subsystem 14 and immobilize bacteria, thereby preventing wash out and conversion. These two features significantly reduce the amount of energy required for aeration in aerobic water purification subsystem 14 compared to conventional systems.

Figure 2:
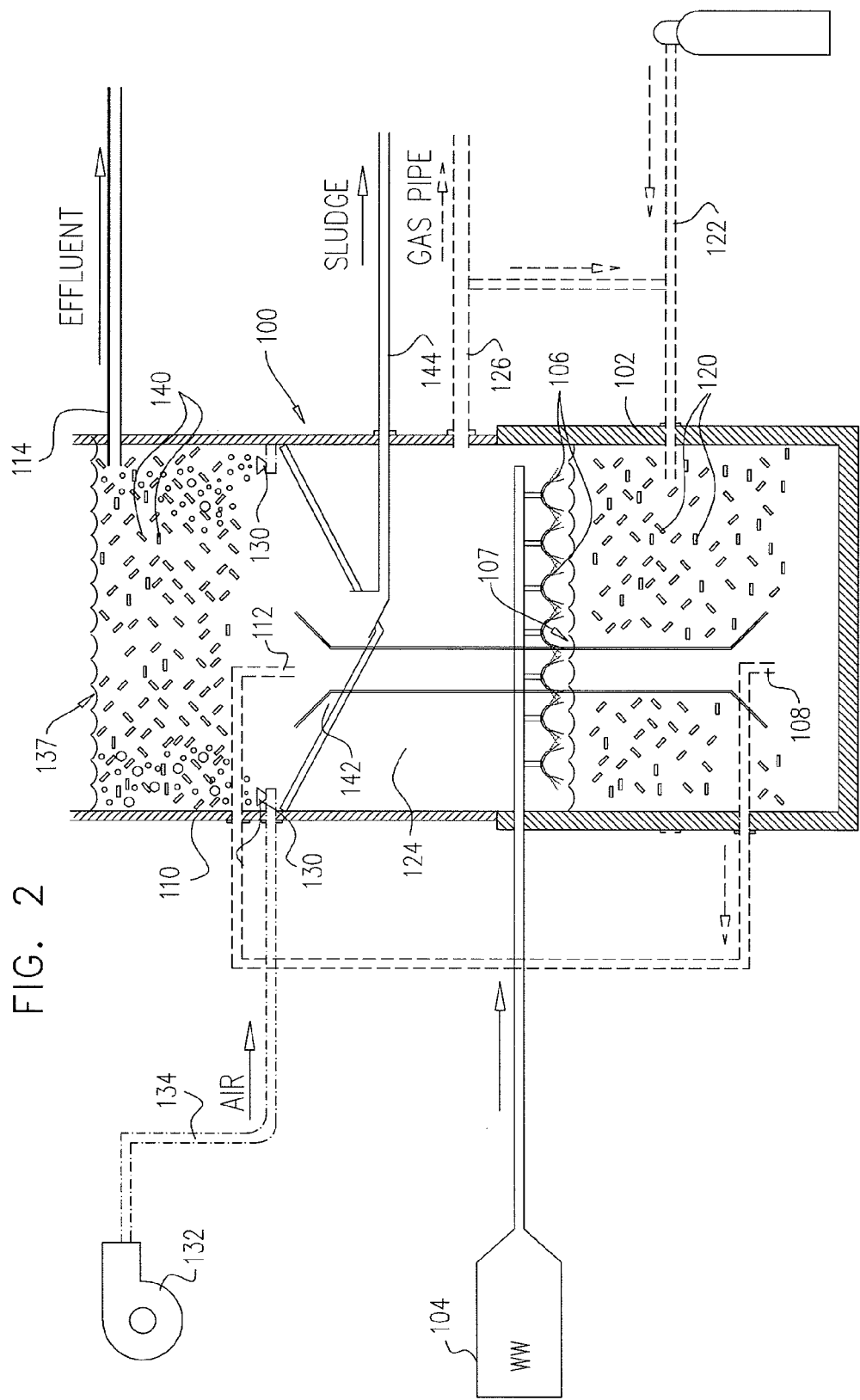
FIG. 2 is a simplified illustration of one embodiment of the synergetic anaerobic/aerobic water purification system of FIG. 1.

Reference is now made to FIG. 2, which is a simplified illustration of one embodiment of the synergetic anaerobic/aerobic water purification system of FIG. 1. As seen in FIG. 2, there is provided an integrated reactor, designated generally by reference numeral 100, which includes an anaerobic water purification subsystem 102, receiving water to be treated, such as waste water, at an inlet 104. Preferably the waste water is supplied from above by means of a plurality of nozzles 106, which are coupled to inlet 104. The water level in anaerobic water purification subsystem 102 is typically as designated by reference numeral 107.

The anaerobic water purification subsystem 102 provides an anaerobic-treated water output via an outlet 108 to an aerobic water purification subsystem 110, integrated with the anaerobic water purification subsystem 102 and preferably physically located thereabove, which receives the anaerobic-treated water output at an inlet 112 and provides an anaerobic- and aerobic-treated water output as an effluent at an outlet 114. If appropriate, the effluent from outlet 114 may be further treated by any suitable technique.

In accordance with a preferred embodiment of the present invention, the anaerobic water purification subsystem 102 includes a multiplicity of biomass carriers 120 which are disposed in water to be treated. Biomass carriers 120 are operative to support anaerobic microorganisms. The structure and operation of a preferred embodiment of biomass carriers is described in applicant/assignee's European Published Patent Application No. 1401775 and PCT Published Patent Application No. WO 2009/10718, the disclosures of which are hereby incorporated by reference. Any other suitable biomass carriers may be employed.

Optionally, an inert gas, such as nitrogen may be periodically introduced into the water to be treated via a gas supply inlet 122 in order to produce limited relative movement of the biomass carriers 120 in order to prevent clogging. Alternatively, this can be accomplished by a circulation pump disposed within the subsystem 102 and/or by a biogas compressor injecting biogas into subsystem 102.

Biogas, principally methane and carbon dioxide, generated by the anaerobic water purification in subsystem 102 rises to a gas collection volume 124 in a headspace above the water being treated in anaerobic water purification subsystem 102 and is preferably released for use via a generated gas outlet 126. Optionally, some of the generated gas may be supplied via gas supply inlet 122 in addition to or in place of the inert gas.

Biogas pressure in gas collection volume 124 causes the anaerobically treated water to rise from anaerobic subsystem 102 through outlet 108 to inlet 112 in aerobic water treatment subsystem 110. Inlet 112 is preferably located in a lower portion of the aerobic subsystem 110. Disposed above inlet 112 there are preferably provided a plurality of air diffusers 130 which are coupled to a source of pressurized air 132, such as a compressor, via a pressurized air conduit 134.

The water level in aerobic water purification subsystem 110 is typically as designated by reference numeral 137. A multiplicity of biomass carriers 140 are disposed in water to be treated in aerobic water purification subsystem 100 and are operative to support anaerobic microorganisms. Any other suitable biomass carriers may be employed. Biomass carriers 140 are generally confined to the volume above diffusers 130, by the movement of air bubbles of the diffusers.

At the bottom of the aerobic water purification subsystem 110, below diffusers 130 there is preferably provided a sludge settlement volume 142, which is equipped with a sludge outlet 144.

Preferably, the structure and operation of the aerobic water purification subsystem 110 is in accordance with the teachings of applicant/assignee's European Published Patent Application Nos. 1401775 and 2049443, and U.S. Published Patent Application No. 2009/0211972, the disclosure of which is hereby incorporated by reference.

Figure 3:
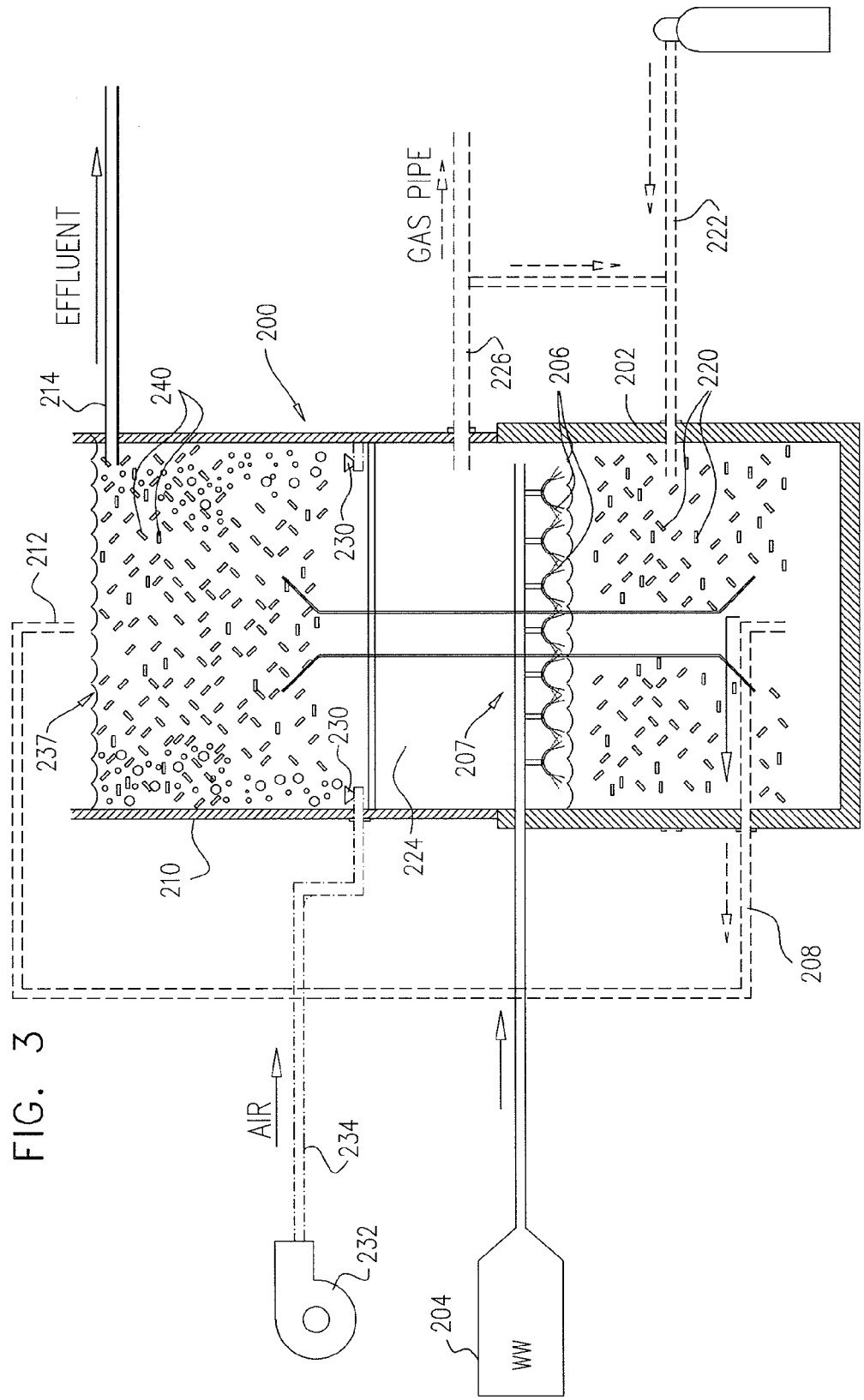
FIG. 3 is a simplified illustration of another embodiment of the synergetic anaerobic/aerobic water purification system of FIG. 1.

Reference is now made to FIG. 3, which is a simplified illustration of another embodiment of the synergetic anaerobic/aerobic water purification system of FIG. 1. As seen in FIG. 3, there is provided an integrated reactor, designated generally by reference numeral 200, which includes an anaerobic water purification subsystem 202, receiving water to be treated, such as waste water, at an inlet 204. Preferably the waste water is supplied from above by means of a plurality of nozzles 206, which are coupled to inlet 204. The water level in anaerobic water purification subsystem 202 is typically as designated by reference numeral 207.

The anaerobic water purification subsystem 202 provides an anaerobic-treated water output via an outlet 208 to an aerobic water purification subsystem 210, integrated with the anaerobic water purification subsystem 202 and preferably physically located thereabove, which receives the anaerobic-treated water output at an inlet 212 and provides an anaerobic- and aerobic-treated water output as an effluent at an outlet 214. If appropriate, the effluent from outlet 214 may be further treated by any suitable technique.

In accordance with a preferred embodiment of the present invention, the anaerobic water purification subsystem 202 includes a multiplicity of biomass carriers 220 which are disposed in water to be treated. Biomass carriers 220 are operative to support anaerobic microorganisms. The structure and operation of a preferred embodiment of biomass carriers is described in applicant/assignee's European Published Patent Application No. 1401775 and PCT Published Patent Application No. WO 2009/10718, the disclosures of which are hereby incorporated by reference. Any other suitable biomass carriers may be employed.

Optionally, an inert gas, such as nitrogen may be periodically introduced into the water to be treated via a gas supply inlet 222 in order to produce limited relative movement of the biomass carriers 220 in order to prevent clogging. Alternatively, this can be accomplished by a circulation pump disposed within the subsystem 202.

Biogas, principally methane and carbon dioxide, generated by the anaerobic water purification in subsystem 202 rises to a gas collection volume 224 in a headspace above the water being treated in anaerobic water purification subsystem 202 and is preferably released for use via a generated gas outlet 226. Optionally, some of the generated gas may be supplied via gas supply inlet 222 in addition to or in place of the inert gas.

Biogas pressure in gas collection volume 224 causes the anaerobically treated water to rise from anaerobic subsystem 202 through outlet 208 to inlet 212 in aerobic water treatment subsystem 210. Inlet 212 is preferably located in a lower portion of the aerobic subsystem 210. Disposed above inlet 212 there are preferably provided a plurality of air diffusers 230 which are coupled to a source of pressurized air 232, such as a compressor, via a pressurized air conduit 234.

The water level in aerobic water purification subsystem 210 is typically as designated by reference numeral 237. A multiplicity of biomass carriers 240 are disposed in water to be treated in aerobic water purification subsystem 200 and are operative to support anaerobic microorganisms. Any other suitable biomass carriers may be employed. Biomass carriers 240 are generally confined to the volume above diffusers 230, by the movement of air bubbles of the diffusers.

Preferably the structure and operation of the aerobic water purification subsystem 210 is in accordance with the teachings of applicant/assignee's European Published Patent Application Nos. 1401775 and 2049443, and U.S. Published Patent Application No. 2009/0211972, the disclosure of which is hereby incorporated by reference.

Figure 4:
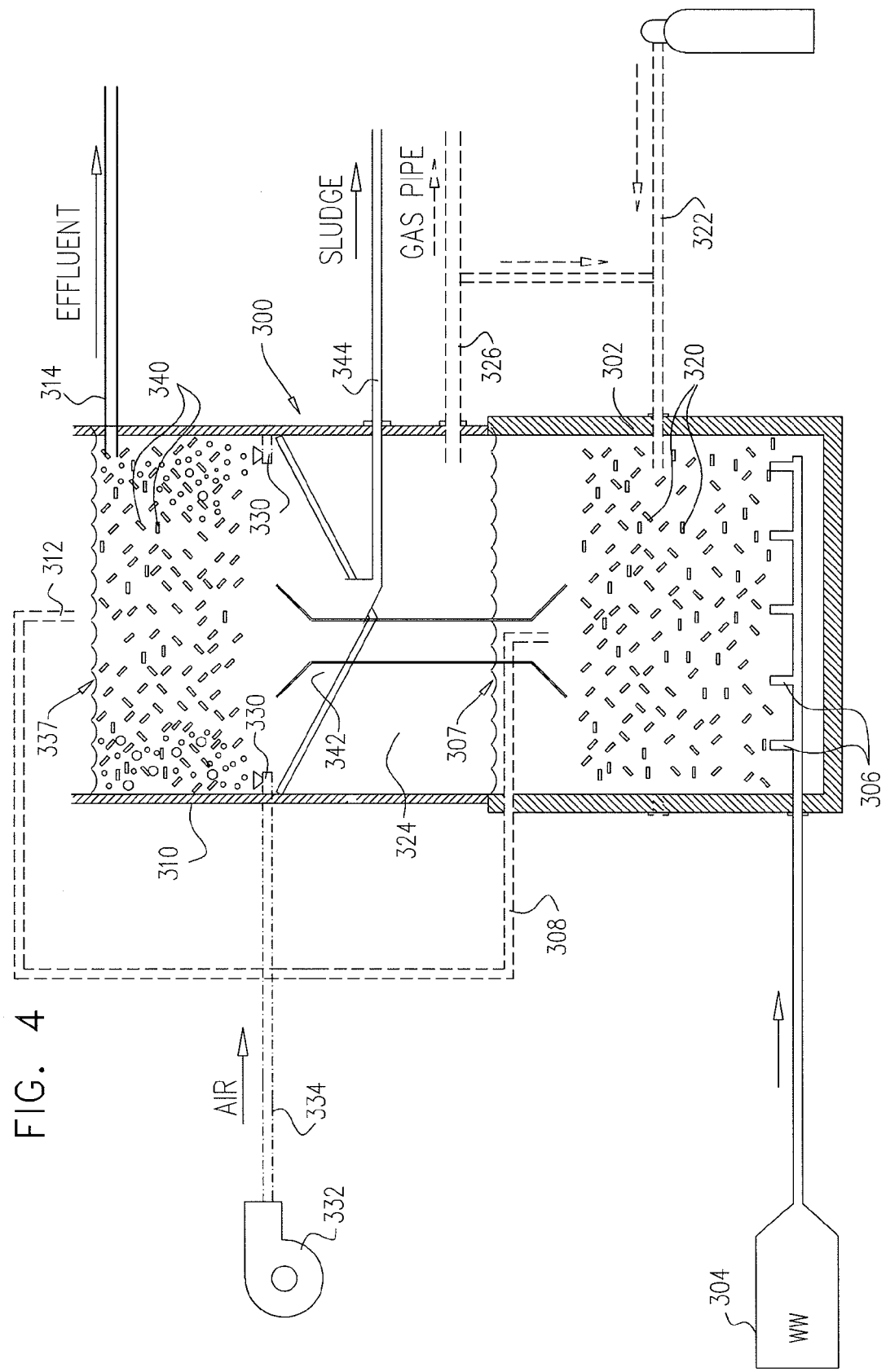
FIG. 4 is a simplified illustration of yet another embodiment of the synergetic anaerobic/aerobic water purification system of FIG. 1.

Reference is now made to FIG. 4, which is a simplified illustration of yet another embodiment of the synergetic anaerobic/aerobic water purification system of FIG. 1. As seen in FIG. 4, there is provided an integrated reactor, designated generally by reference numeral 300, which includes an anaerobic water purification subsystem 302, receiving water to be treated, such as waste water, at an inlet 304. Preferably the waste water is supplied from below by means of a plurality of nozzles 306, which are coupled to inlet 304. The water level in anaerobic water purification subsystem 302 is typically as designated by reference numeral 307.

The anaerobic water purification subsystem 302 provides an anaerobic-treated water output via an outlet 308 to an aerobic water purification subsystem 310, integrated with the anaerobic water purification subsystem 302 and preferably physically located thereabove, which receives the anaerobic-treated water output at an inlet 312 and provides an anaerobic- and aerobic-treated water output as an effluent at an outlet 314. If appropriate, the effluent from outlet 314 may be further treated by any suitable technique.

In accordance with a preferred embodiment of the present invention, the anaerobic water purification subsystem 302 includes a multiplicity of biomass carriers 320 which are disposed in water to be treated. Biomass carriers 320 are operative to support anaerobic microorganisms. The structure and operation of a preferred embodiment of biomass carriers is described in applicant/assignee's European Published Patent Application No. 1401775 and PCT Published Patent Application No. WO 2009/10718, the disclosures of which are hereby incorporated by reference. Any other suitable biomass carriers may be employed.

Optionally, an inert gas, such as nitrogen may be periodically introduced into the water to be treated via a gas supply inlet 322 in order to produce limited relative movement of the biomass carriers 320 in order to prevent clogging. Alternatively, this can be accomplished by a circulation pump disposed within the subsystem 302.

Biogas, principally methane and carbon dioxide, generated by the anaerobic water purification in subsystem 302 rises to a gas collection volume 324 in a headspace above the water being treated in anaerobic water purification subsystem 302 and is preferably released for use via a generated gas outlet 326. Optionally, some of the generated gas may be supplied via gas supply inlet 322 in addition to or in place of the inert gas.

Biogas pressure in gas collection volume 324 causes the anaerobically treated water to rise from anaerobic subsystem 302 through outlet 308 to inlet 312 in aerobic water treatment subsystem 310. Inlet 312 is preferably located in a lower portion of the aerobic subsystem 310. Disposed above inlet 312 there are preferably provided a plurality of air diffusers 330 which are coupled to a source of pressurized air 332, such as a compressor, via a pressurized air conduit 334.

The water level in aerobic water purification subsystem 310 is typically as designated by reference numeral 337. A multiplicity of biomass carriers 340 are disposed in water to be treated in aerobic water purification subsystem 300 and are operative to support anaerobic microorganisms. Any other suitable biomass carriers may be employed. Biomass carriers 340 are generally confined to the volume above diffusers 330, by the movement of air bubbles of the diffusers.

At the bottom of the aerobic water purification subsystem 310, below diffusers 330 there is preferably provided a sludge settlement volume 342, which is equipped with a sludge outlet 344.

Preferably the structure and operation of the aerobic water purification subsystem 310 is in accordance with the teachings of applicant/assignee's European Published Patent Application Nos. 1401775 and 2049443, and U.S. Published Patent Application No. 2009/0211972, the disclosure of which is hereby incorporated by reference.

Figure 5:
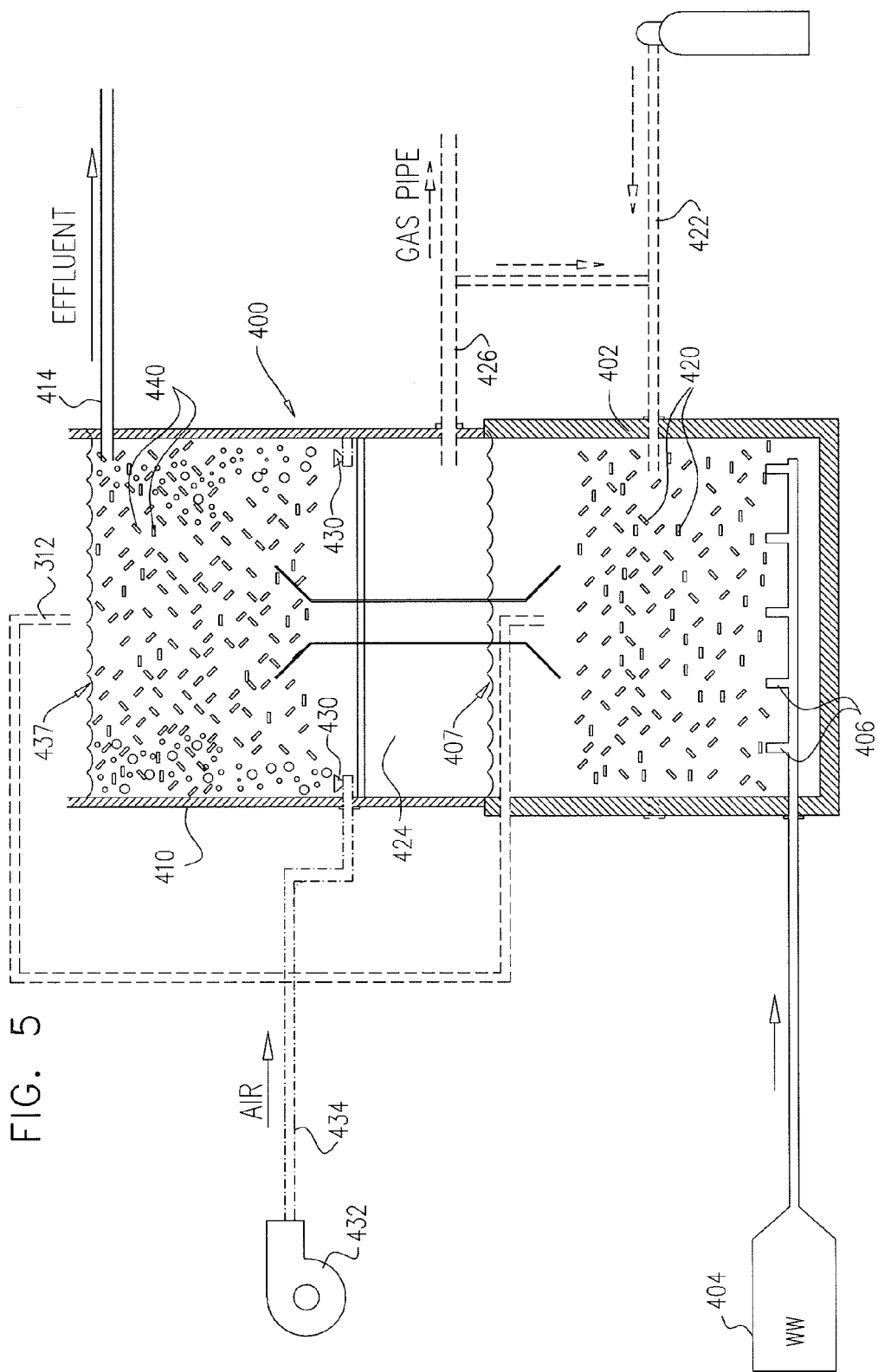
FIG. 5 is a simplified illustration of still another embodiment of the synergetic anaerobic/aerobic water purification system of FIG. 1.

Reference is now made to FIG. 5, which is a simplified illustration of still another embodiment of the synergetic anaerobic/aerobic water purification system of FIG. 1. As seen in FIG. 5, there is provided an integrated reactor, designated generally by reference numeral 400, which includes an anaerobic water purification subsystem 402, receiving water to be treated, such as waste water, at an inlet 404. Preferably the waste water is supplied from below by means of a plurality of nozzles 406, which are coupled to inlet 404. The water level in anaerobic water purification subsystem 402 is typically as designated by reference numeral 407.

The anaerobic water purification subsystem 402 provides an anaerobic-treated water output via an outlet 408 to an aerobic water purification subsystem 410, integrated with the anaerobic water purification subsystem 402 and preferably physically located thereabove, which receives the anaerobic-treated water output at an inlet 412 and provides an anaerobic- and aerobic-treated water output as an effluent at an outlet 414. If appropriate, the effluent from outlet 414 may be further treated by any suitable technique.

In accordance with a preferred embodiment of the present invention, the anaerobic water purification subsystem 402 includes a multiplicity of biomass carriers 420 which are disposed in water to be treated. Biomass carriers 420 are operative to support anaerobic microorganisms. Any other suitable biomass carriers may be employed.

Optionally, an inert gas, such as nitrogen may be periodically introduced into the water to be treated via a gas supply inlet 422 in order to produce limited relative movement of the biomass carriers 420 in order to prevent clogging. Alternatively, this can be accomplished by a circulation pump disposed within the subsystem 402.

Biogas, principally methane and carbon dioxide, generated by the anaerobic water purification in subsystem 402 rises to a gas collection volume 424 in a headspace above the water being treated in anaerobic water purification subsystem 402 and is preferably released for use via a generated gas outlet 426. Optionally, some of the generated gas may be supplied via gas supply inlet 422 in addition to or in place of the inert gas.

Biogas pressure in gas collection volume 424 causes the anaerobically treated water to rise from anaerobic subsystem 402 through outlet 408 to inlet 412 in aerobic water treatment subsystem 410. Inlet 412 is preferably located in a lower portion of the aerobic subsystem 410. Disposed above inlet 412 there are preferably provided a plurality of air diffusers 430 which are coupled to a source of pressurized air 432, such as a compressor, via a pressurized air conduit 434.

The water level in aerobic water purification subsystem 410 is typically as designated by reference numeral 437. A multiplicity of biomass carriers 440 are disposed in water to be treated in aerobic water purification subsystem 400 and are operative to support anaerobic microorganisms. Any other suitable biomass carriers may be employed. Biomass carriers 440 are generally confined to the volume above diffusers 430, by the movement of air bubbles of the diffusers.

Preferably the structure and operation of the aerobic water purification subsystem 410 is in accordance with the teachings of applicant/assignee's European Published Patent Application Nos. 1401775 and 2049443, and U.S. Published Patent Application No. 2009/0211972, the disclosure of which is hereby incorporated by reference.

Figure 6:
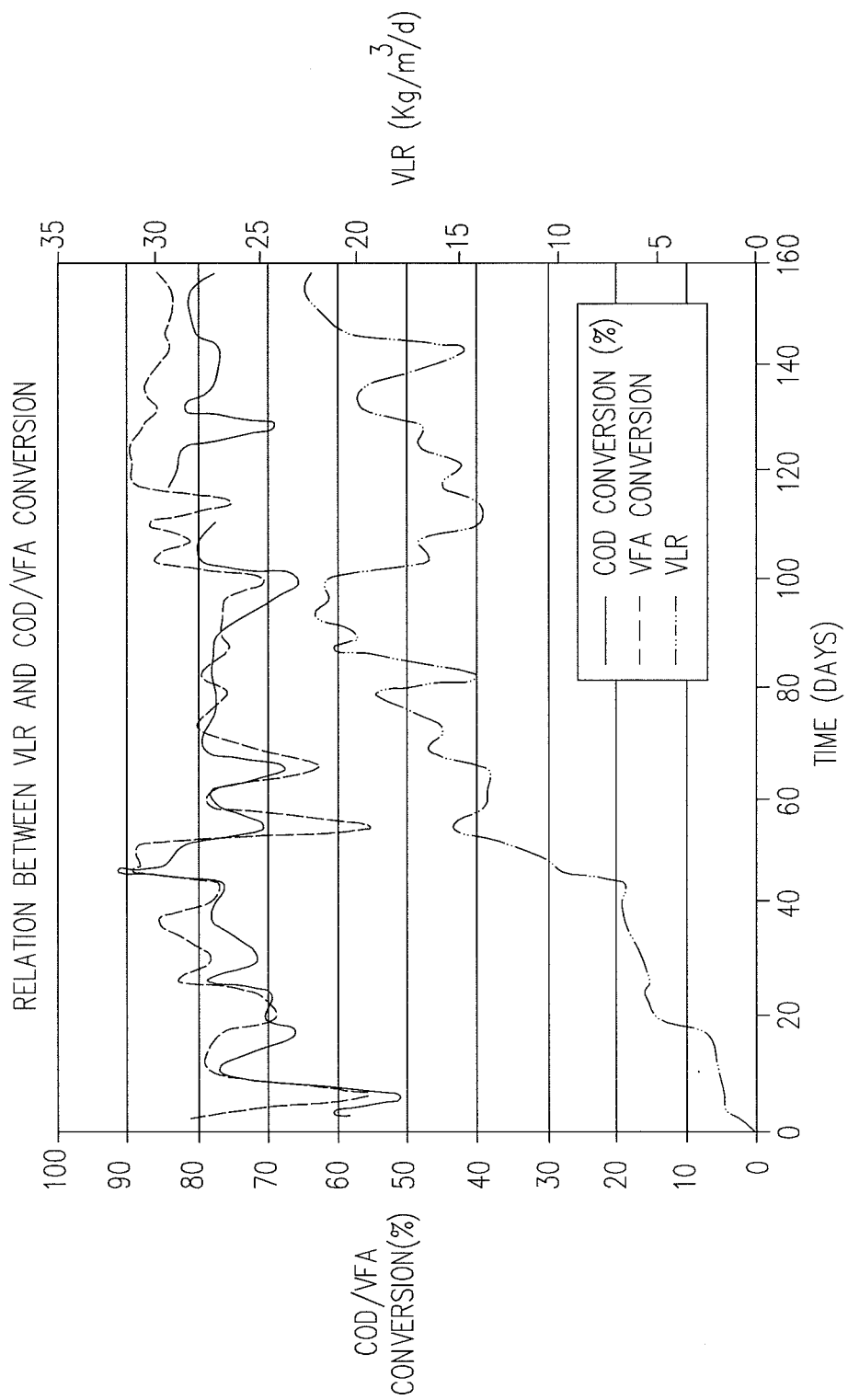
FIGS. 6 & 7 show experimental results of use of the system in accordance with the embodiment of FIG. 1 of the present invention.
Figure 7:
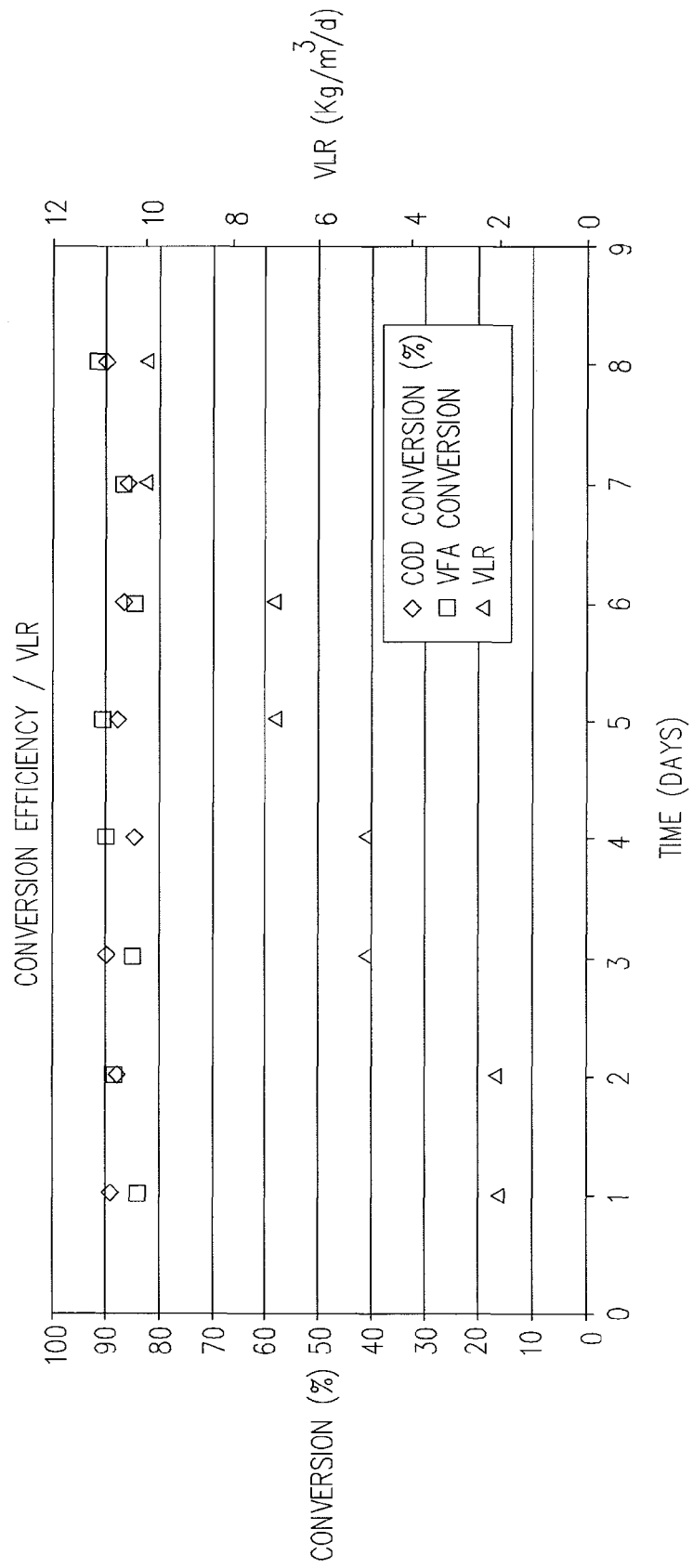

Reference is now made to FIGS. 6 & 7, which show experimental results of use of the system in accordance with the embodiment of FIG. 1 of the present invention.

In an experiment shown in FIG. 6, a lab scale anaerobic reactor having a volume of 19 liters, a height of 2 meters and a diameter of 11 cm, was used for a first experiment illustrating the principle of immobilizing anaerobic biomass onto biomass carrier material. A fermented molasses product was fed to the reactor. The volumetric loading rate (VLR) was controlled by adjustments of the COD concentration and feed flow. The reactor was operated in a downflow configuration. The fluid velocity ranged from 0.25 m/h to 0.67 m/h. The pH level was adjusted to pH 7 with NaOH, and the temperature was a constant 35° C.

FIG. 6 shows the relation between the applied VLR (in $kg/m^3/d$) and the conversion (in %) of COD and VFA (with COD conversion shown as a solid line, VFA conversion shown as a dashed line and VLR shown as a dashed-dotted line). During the experiment, an increase in biomass development upon the carrier material was observed, which allowed for a higher VLR. The system showed a stable conversion of VFA and COD up to a VLR of 22 $kg/m^3/d$.

In an experiment shown in FIG. 7, a dynamic anaerobic aerobic (DANA) reactor with an anaerobic part having a volume of 2.35 cubic meters, a height of 3 meters, a diameter of 1 meter, a carrier bed height of 1.3 meter, a surface area of 0.78 square meters, and an aerobic part having a height of 3.5 meters, a carrier bed having a height of 1.3 meters, and a diameter of 1 meter, was used to treat waste water from a starch factory. Waste water with an average COD concentration of 5 g/l was treated. The anaerobic reactor was operated in a downflow mode. At a maximum of 200 l/h of waste water fed, combined with a recirculation flow of 400 l/h, the downflow velocity reached was 0.76 m/h. The dissolved oxygen level in the aerobic tank was maintained at 2 mg/l. Temperature of the influent was 35° C.-37° C., and the pH was maintained at 6.8 with NaOH.

Inoculation of the anaerobic tank was achieved using 10% inoculated carrier material at the top part of the carrier bed. Within one month a volumetric loading rate (VLR) of 10 $kg/m^3/d$ was reached. FIG. 7 shows COD and VFA conversion (in %) of the total DANA reactor plotted against the VLR (in $kg/m^3/d$). The average conversion of the anaerobic part was 80% and the remaining COD/VFA was 90% converted by the aerobic reactor. The total average conversion for the DANA reactor was 95%.

It will be appreciated by persons skilled in the art that the present invention is not limited by what has been particularly shown and described hereinabove. Rather, the scope of the invention includes both combinations and subcombinations of various features described hereinabove as well as modifications and variations thereof which would occur to persons skilled in the art upon reading the foregoing and which are not in the prior art.

The invention claimed is:

1. An anaerobic/aerobic water purification system comprising:
   an anaerobic water purification subsystem receiving water to be treated and providing an anaerobic-treated water output, said anaerobic water purification subsystem comprising biomass carriers for supporting anaerobic microorganisms, said biomass carriers having a density which is lower than the density of water;
   an aerobic water purification subsystem, integrated with said anaerobic water purification subsystem, receiving said anaerobic-treated water output and providing an anaerobic- and aerobic-treated water output, said aerobic water purification subsystem including moving bed biofilm reactor functionality; and
   a gas collection volume located above said anaerobic water purification subsystem and below said aerobic water purification subsystem for collecting gas produced by said anaerobic water purification subsystem,
   wherein pressure created by the accumulation of said gas produced by said anaerobic water purification subsystem is operative to pump said anaerobic-treated water output from said anaerobic water purification subsystem to said aerobic water purification subsystem.

2. An anaerobic/aerobic water purification system according to claim 1 and wherein said aerobic water purification subsystem is located physically above said anaerobic water purification subsystem.

3. An anaerobic/aerobic water purification system according to claim 1 and wherein said gas collection volume is located in a headspace above said anaerobic water purification subsystem.

4. An anaerobic/aerobic water purification system according to claim 1 and also comprising gas supply functionality for supplying gas to said anaerobic water purification subsystem for causing relative movement of said biomass carriers.

5. An anaerobic/aerobic water purification system according to claim 4 and wherein said gas supply functionality supplies gas received from said gas collection volume.

6. An anaerobic/aerobic water purification system according to claim 1 and wherein said anaerobic water purification subsystem receives water to be treated at a location near the bottom thereof.

7. An anaerobic/aerobic water purification system according to claim 1 and wherein said aerobic water purification subsystem includes moving bed clarifying reactor functionality.

8. An anaerobic/aerobic water purification system according to claim 1 and wherein said anaerobic water purification subsystem receives water to be treated at a location near the top thereof.

9. An anaerobic/aerobic water purification system comprising:
an anaerobic water purification subsystem receiving water to be treated and providing an anaerobic-treated water output, said anaerobic water purification subsystem comprising biomass carriers for supporting anaerobic microorganisms, said biomass carriers having a density which is lower than the density of water;
an aerobic water purification subsystem, located physically above said anaerobic water purification subsystem, receiving said anaerobic-treated water output and providing an anaerobic- and aerobic-treated water output; and
a gas collection volume located above said anaerobic water purification subsystem and below said aerobic water purification subsystem for collecting gas produced by said anaerobic water purification subsystem,
wherein pressure created by the accumulation of said gas produced by said anaerobic water purification subsystem is operative to pump said anaerobic-treated water output from said anaerobic water purification subsystem to said aerobic water purification subsystem.

10. An anaerobic/aerobic water purification system according to claim 9 and wherein said gas collection volume is located in a headspace above said anaerobic water purification subsystem.

11. An anaerobic/aerobic water purification system according to claim 9 and also comprising gas supply functionality for supplying gas to said anaerobic water purification subsystem for causing relative movement of said biomass carriers.

12. An anaerobic/aerobic water purification system according to claim 11 and wherein said gas supply functionality supplies gas received from said gas collection volume.

13. An anaerobic/aerobic water purification system according to claim 9 and wherein said aerobic water purification subsystem includes moving bed biofilm reactor functionality.

14. An anaerobic/aerobic water purification system according claim 9 and wherein said aerobic water purification subsystem includes moving bed clarifying reactor functionality.

15. An anaerobic/aerobic water purification system according to claim 9 and wherein said anaerobic water purification subsystem receives water to be treated at a location near the bottom thereof.

16. An anaerobic/aerobic water purification method comprising:
anaerobic water purification providing an anaerobic-treated water output, said anaerobic water purification utilizing biomass carriers for supporting anaerobic microorganisms, said biomass carriers having a density which is lower than the density of water;
aerobic water purification, integrated with said anaerobic water purification, receiving said anaerobic-treated water output and providing an anaerobic- and aerobic-treated water output, said aerobic water purification employing moving bed biofilm reactor functionality; and
collecting gas produced by said anaerobic water purification in a headspace,
wherein pressure created by the accumulation of said gas produced by said anaerobic water purification is operative to pump said anaerobic-treated water output from said anaerobic water purification to said aerobic water purification.

17. An anaerobic/aerobic water purification method according to claim 16 and wherein said aerobic water purification includes moving bed clarifying reactor functionality.

18. An anaerobic/aerobic water purification method according to claim 16 and also comprising supplying gas for causing relative movement of said biomass carriers.

19. An anaerobic/aerobic water purification method according to claim 18 and wherein said supplying gas utilizes gas received from said headspace.

20. An anaerobic/aerobic water purification method according to claim 16 and wherein said aerobic water purification includes moving bed clarifying reactor functionality.

21. An anaerobic/aerobic liquid purification system comprising:
an anaerobic liquid purification subsystem comprising an inlet for receiving liquid to be treated and an outlet providing an anaerobic-treated liquid output said anaerobic liquid purification subsystem also comprising biomass carriers for supporting anaerobic microorganisms, said biomass carriers having a density which is lower than the density of water; and
an aerobic liquid purification subsystem, comprising an inlet for receiving said anaerobic-treated liquid output and an outlet for providing an anaerobic- and aerobic-treated liquid output, said aerobic liquid purification subsystem including moving bed biofilm reactor functionality;
and wherein:
said inlet of said aerobic liquid purification subsystem is connected to said outlet of said anaerobic liquid purification subsystem, and
pressure in said anaerobic liquid purification subsystem is operative to pump said anaerobic-treated liquid output from said anaerobic liquid purification subsystem to said aerobic liquid purification subsystem.

22. An anaerobic/aerobic liquid purification system according to claim 21 and further comprising a gas collection volume located in a headspace above said anaerobic liquid purification subsystem for collecting gas produced by said anaerobic liquid purification system.

23. An anaerobic/aerobic liquid purification system according to claim 22 and further comprising a gas supply mechanism for supplying gas to said anaerobic liquid purification subsystem.

24. An anaerobic/aerobic liquid purification system according to claim 23 and wherein said gas supply mechanism is connected to said gas collection volume.

25. An anaerobic/aerobic liquid purification system according to claim 21 and wherein said aerobic liquid purification subsystem is located above said anaerobic liquid purification subsystem.

26. An anaerobic/aerobic liquid purification system according to claim 21 and further comprising liquid recirculation functionality.

27. An anaerobic/aerobic liquid purification method comprising:
   anaerobic purifying of liquid in an anaerobic liquid purification subsystem provided with an anaerobic-treated liquid outlet;
   aerobic purifying of liquid in an aerobic liquid purification subsystem provided with an inlet for receiving said anaerobic-treated liquid, at least one of said anaerobic purifying and said aerobic purifying utilizing biomass carriers for supporting anaerobic microorganisms, said biomass carriers having a density which is lower than the density of water, at least one of said aerobic liquid purification subsystem and said anaerobic liquid purification subsystem including moving bed biofilm reactor functionality; and
   integrating said subsystems by connecting said outlet of said anaerobic subsystem to said inlet of said aerobic subsystem,
   wherein pressure in said anaerobic liquid purification subsystem is operative to pump anaerobic-treated liquid output from said anaerobic liquid purification subsystem to said aerobic liquid purification subsystem.

28. An anaerobic/aerobic liquid purification method according to claim 27, further comprising supplying gas to said anaerobic liquid purification subsystem for causing relative movement of said biomass carriers.

29. An anaerobic/aerobic liquid purification method according to claim 28 and wherein said supplying gas utilizes gas produced in said anaerobic liquid purification subsystem.

* * * * *